A. HAVEN.
ANIMAL POKE.
APPLICATION FILED APR. 13, 1911.

1,031,551.

Patented July 2, 1912.

Witnesses
J. G. Stinkel
Charles N. Murray.

Inventor
A. Haven
by Eugene C. Brown
Attorney

UNITED STATES PATENT OFFICE.

ALONZO HAVEN, OF BRISTOW, OKLAHOMA, ASSIGNOR, BY MESNE ASSIGNMENTS, OF ONE-HALF TO JOHN EWIN BARNETT, OF BRISTOW, OKLAHOMA.

ANIMAL-POKE.

1,031,551.     Specification of Letters Patent.     Patented July 2, 1912.

Application filed April 13, 1911. Serial No. 620,928.

*To all whom it may concern:*

Be it known that I, ALONZO HAVEN, a citizen of the United States, residing at Bristow, in the county of Creek and State of Oklahoma, have invented new and useful Improvements in Animal-Pokes, of which the following is a specification.

My invention relates to certain improvements in animal-pokes which are carried upon the head of the animal and are so constructed that if the animal attempts to pass through, under, or over a fence, the poke will prevent it.

One of the objects of my invention is to construct a poke which is exceedingly simple in construction and yet so constructed that it will fit easily over the head and embrace the nose, and yet will not interfere with the feeding or be in any manner injurious to the animal.

A further object is to combine with the features above mentioned, a hook or prong which will effectually prevent a cow from taking her own milk, a habit which cows frequently acquire.

Other objects will be apparent from the following description, taken in connection with the accompanying drawings, in which—

Figure 1:
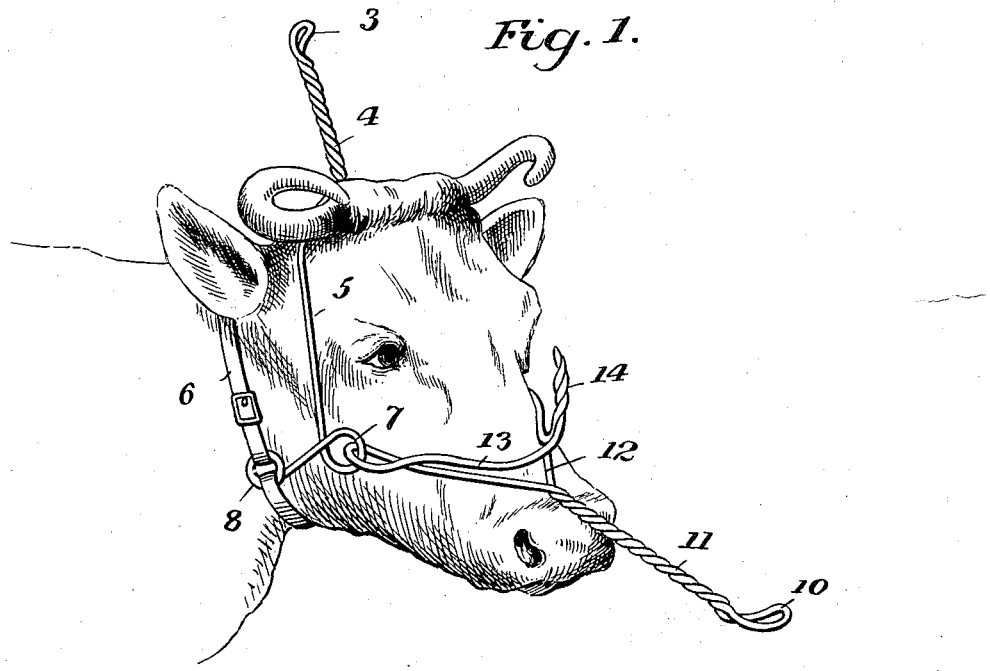
Figure 2:
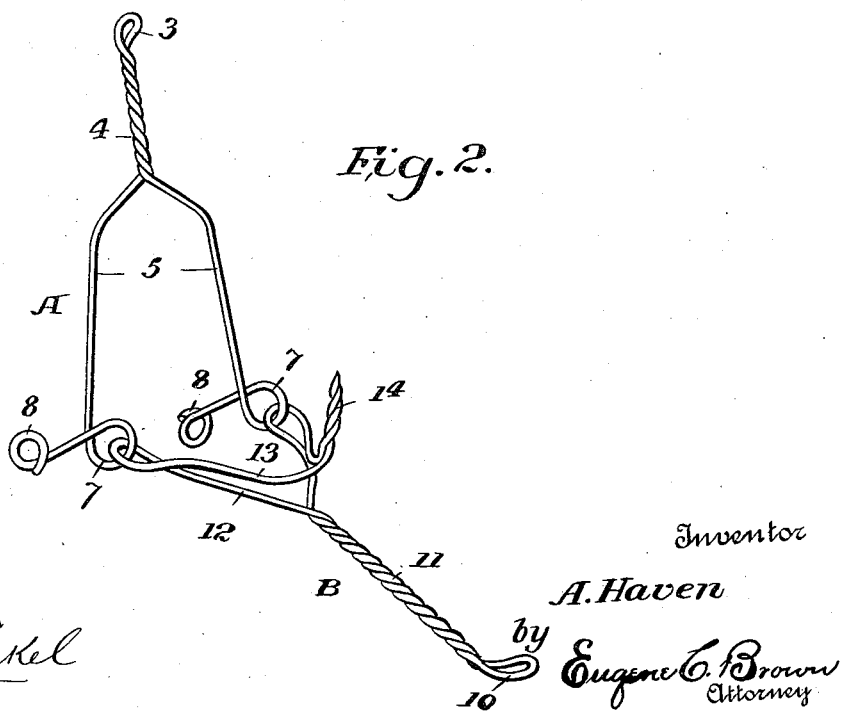

Figure 1 is a view of the head of an animal showing my improved poke applied thereto; and Fig. 2 is a perspective view of the poke.

In the embodiment illustrated in the drawings; the poke is formed or two members A and B, each being constructed of a single piece of wire. The wire forming the upper member is bent at its center to form the hook 3, and is then twisted into the upwardly extending rod or arm 4, the branches of the wire being then separated to form the arch or yoke 5, which passes over the head of the animal. The lower ends of the wires are bent into the loops or rings 7 and 8. In like manner the lower portion B is constructed by bending the wire at the center to form the hook 10, then twisted into the stem or rod 11, and spread outwardly to form the yoke or bridge piece 12, which straddles the nose of the animal; after which the ends are looped through the rings 7 and are brought forward to fit over the nose of the animal, forming the bridge 13, and twisted into a sharp pointed prong 14, which is turned upwardly in the manner shown. After the poke has been placed in position over the head of the animal, it may be secured by means of a neck strap or halter 15.

It will be apparent from the foregoing description that an animal provided with a poke constructed according to my invention, will be caught by the projecting guard-arms or rods 4 and 11 in case it attempts to pass through or under a fence, and by the lower guard 11 if it attempts to jump over the fence. The arched bridge piece 12 passing over the nose forms a very strong support for the rod when struck by a fence or other obstacle, being firmly braced upon either side of the animal's head. This feature will be especially appreciated by those having experience with the handling of stock, and who recognize the necessity of providing a well-braced and properly adjusted poke. The position of the poke also has a tendency to swing the head of the animal downward as it bears against the cartilage of the nose.

Cattle raisers are familiar with the habit of some cows to suck their own milk. For the purpose of preventing this, I form a prong or spear 14 over the bridge-piece which will project forward and stick the side of the cow whenever she attempts to take her own milk. When the poke is used upon horses or sheep, this device may be omitted, and when used merely to prevent horses from jumping fences, the upper member A is also unnecessary.

When the animal is feeding, the lower guard-arm meets the ground, and swings the member B upon the rings 7, so that it does not interfere in any manner with its eating.

Having thus described my invention and the manner in which it may be embodied, I claim as new and desire to secure by Letters Patent,—

1. An animal-poke comprising two members pivotally secured together, one member having a yoke adapted to pass over the head of the animal and provided with an upwardly extending guard-arm, and the other member having a yoke or bridge-piece to embrace the nose, and pivotally attached to said first-named yoke and free to swing thereon and provided with a depending guard-arm adapted to rest upon and project beyond the nose, and an integral prong extending upwardly from and supported over said brideg piece.

2. An animal-poke comprising two members pivotally secured together, one member comprising a yoke adapted to pass over the head of the animal and provided with an upwardly extending guard-arm, and the other member comprising a swinging yoke or bridge-piece to embrace the nose and provided with a depending guard-arm adapted to rest upon and project beyond the nose, and a prong movable with and extending upwardly from the bridge-piece.

In testimony whereof I have hereunto set my hand in presence of two subscribing witnesses.

ALONZO HAVEN.

Witnesses:
B. H. GREENWOOD,
SAM A. ABRAHAM.

---

Copies of this patent may be obtained for five cents each, by addressing the "Commissioner of Patents, Washington, D. C."